United States Patent
Hasegawa

[11] Patent Number: 6,113,110
[45] Date of Patent: *Sep. 5, 2000

[54] METAL GASKET

[75] Inventor: Hirokazu Hasegawa, Yamato, Japan

[73] Assignee: Nippon Reinz Co., Ltd., Kanagawa, Japan

[*] Notice: This patent is subject to a terminal disclaimer.

[21] Appl. No.: 09/042,823

[22] Filed: Mar. 17, 1998

[30] Foreign Application Priority Data

Mar. 19, 1997 [JP] Japan .................................. 9-065986

[51] Int. Cl.[7] ..................................................... F02F 11/00
[52] U.S. Cl. .............................................................. 277/593
[58] Field of Search ..................................... 277/592, 593, 277/594, 598, 591

[56] References Cited

U.S. PATENT DOCUMENTS

| | | |
|---|---|---|
| 4,397,472 | 8/1983 | Czernik . |
| 4,721,315 | 1/1988 | Ueta ....................................... 277/643 |
| 4,799,695 | 1/1989 | Yoshino ................................. 277/592 |
| 4,807,892 | 2/1989 | Udagawa ............................ 277/592 X |
| 4,834,399 | 5/1989 | Udagawa et al. ..................... 277/592 |
| 4,898,396 | 2/1990 | Udagawa ................................ 277/592 |
| 5,255,926 | 10/1993 | Udagawa ............................... 277/643 |
| 5,490,681 | 2/1996 | Plunkett et al. ....................... 277/592 |
| 5,511,796 | 4/1996 | Udagawa ............................ 277/595 X |
| 5,582,415 | 12/1996 | Yoshida et al. ........................ 277/592 |
| 5,893,566 | 4/1999 | Miyaoh et al. ........................ 277/592 |

FOREIGN PATENT DOCUMENTS

| | | |
|---|---|---|
| 0 494 489 | 7/1992 | European Pat. Off. . |
| 0 590 944 | 4/1994 | European Pat. Off. . |
| 0757 195 | 2/1997 | European Pat. Off. . |
| 0 797 029 | 9/1997 | European Pat. Off. . |

*Primary Examiner*—Anthony Knight
*Assistant Examiner*—Karlena D. Schwing
*Attorney, Agent, or Firm*—Merchant & Gould P.C.

[57] ABSTRACT

The present invention relates to a metal gasket for sealing the joint surfaces of the cylinder head and the cylinder block of an internal combustion engine. The metal gasket comprises a plural number of metal plates and an annular rigid resin layer, each of the metal plates having opening(s) corresponding to the combustion chamber hole(s) of the gasket and bolt holes. The plural number of the metal plates are laminated so as to be overlaid on each other. The first metal plate disposed on the side of one outer surface of the gasket has a bent portion formed by turning back the peripheral portion of its opening, the bent portion having a curved portion and a flange portion. The bent portion encloses the peripheral portion of the opening of the second metal plate which is one of the metal plates laminated. The annular rigid resin layer is formed of, e.g., an epoxy resin. The rigid resin layer is disposed on either the surface of the second metal plate confronting the first metal plate or the inner surface of the first metal plate, or on one of the surfaces of the metal plates laminated between both of the above surfaces, so as to surround the combustion chamber hole. The thickness of the part of the gasket in which the rigid resin layer is disposed is larger than that of the remaining part of the gasket.

15 Claims, 6 Drawing Sheets

$h > h'$ $h/h'$ h > h' h > h'

METAL GASKET

BACKGROUND OF THE INVENTION

The present invention relates to a metal gasket, what is called a cylinder head gasket, for use in sealing the joint surfaces of the cylinder head and the cylinder block of an internal combustion engine.

There is well known a cylinder head gasket constructed by laminating metal plates having combustion chamber hole(s), bolt hole(s), hole(s) for cooling water passage and oil passage and the like, wherein the upper plate 101, intermediate plate 104, thickness-adjusting plate 103 and lower plate 102 are laminated, for example, as shown in FIG. 1, and wherein the thickness of the peripheral portion of the combustion chamber hole 105 of the gasket is made larger than that of the remaining portion of the gasket by providing a bent portion 106 which is formed by turning back the upper plate 101, and by making the thickness of the upper plate 101 larger than that of the thickness adjusting plate 103. When such a gasket is attached to an engine and fastened, a high annular sealing pressure zone takes place around the peripheral portion of the combustion chamber hole. It is also well known that, in the above gasket, a bead portion for surrounding the combustion chamber hole is formed, for example, in the intermediate plate 104 so as to add a high pressure resulting from the resilience of the bead portion to the high pressure resulting from the above difference in thickness of the gasket so that the sealing effect of the gasket can be increased. In this regard, the thickness of a certain portion of a gasket referred to in the present specification means the sum of the respective thickness of metal plates laminated and that of a rigid resin layer.

In the metal gasket as constructed above, the difference in thickness between the peripheral portion of the combustion chamber hole and the remaining portion of the gasket is determined by difference in thickness between the metal plates 101 and 103, and therefore, it is difficult to construct the gasket with a difference in thickness between both the above portions of the gasket so that a desired pressure distribution can be created.

A fastening force the gasket receive when fastened differs partially depending on a position, that is, on whether a portion of the gasket locates in the vicinity of a bolt hole or is spaced away from the bolt hole. Accordingly, the sealing pressure to the peripheral portion of the combustion chamber hole differs partially between both positions as above. In order to uniform a sealing pressure onto the peripheral portion of the combustion chamber hole, it is required to vary the thickness of the peripheral portion of the combustion chamber hole of the gasket in accordance with a distance from a bolt hole. Such a thickness adjustment is, however, practically impossible in the above metal gasket.

The assignee of the present invention previously proposed the following metal gasket in Japanese Patent application No. 8-138196 (Japanese Laid-Open Patent Publication No. 9-317890 issued on Dec. 12, 1997). That is, the metal gasket comprises, as shown in FIG. 2, a metal plate 100; a groove 107 formed in one surface thereof surrounding the combustion chamber hole 105; a rigid resin layer 108 of, for example, epoxy resin, so formed in the groove 107 as to be raised from the surface of the metal plate 100; and a bead portion 109 for surrounding the combustion chamber hole 105, said bead portion 109 being formed outside the rigid resin layer 108 with its height greater than that of the rigid resin layer 108. The assignee also proposed that the height of the rigid resin layer 108 from the surface of the metal plate is varied in accordance with a position on the peripheral portion of the combustion chamber hole 105: the height of the rigid resin layer 108 is lower in the vicinity of a bolt hole and it is higher between each of bolt holes. The rigid resin layer 108 serves to increase the thickness of the gasket at the peripheral portion of the combustion chamber hole so that a higher annular sealing pressure zone can take place at the peripheral portion of the combustion chamber hole. The rigid resin layer can be formed with a desired thickness, and the thickness of the rigid resin layer can be varied easily in accordance with a position on the peripheral portion of the combustion chamber hole.

However, the metal gasket having such a rigid resin layer has a problem that, since the rigid resin layer is exposed directly to a high temperature combustion gas during operation of an engine, there is a fear that the rigid resin layer will deteriorate and burn during a long term of use. Also, the metal gasket has another problem that, where the rigid resin layer comes into contact with the joint surfaces of a cylinder head and a cylinder block when the gasket is attached to an engine, the rigid resin layer is worn down by friction with the joint surfaces due to vibrations of the cylinder head and the cylinder block during operation of the engine and thermal expansion or contraction of the cylinder head and the cylinder block accompanying the start or stop of operation of the engine. Thus, the gasket loses its function and decreases in sealing performance during a long term of use. Further, the deterioration proceeds more due to interaction between attack of a combustion gas and the friction with the joint surfaces.

SUMMARY OF THE INVENTION

The present invention has been made with the purpose of solving the foregoing problems. An object of the present invention is to provide a cylinder head gasket which comprises a rigid resin layer that serves to easily adjust to a desired value the difference between the thickness of the peripheral portion of the combustion chamber hole of the gasket and the thickness of the remaining portion of the gasket. Another object of the present invention is to provide a cylinder head gasket which comprises a rigid resin layer that permits variation of the above difference in thickness at a part of the gasket spaced away from a bolt hole disposed around the combustion chamber hole and at a part of the gasket in the vicinity of the bolt hole. A further object of the present invention is to provide a cylinder head gasket of which the above rigid resin layer is not exposed to a high temperature combustion gas and is not worn down by friction with the joint surfaces of a cylinder head and a cylinder block.

A metal gasket of the present invention capable of achieving the above objects comprises a plural number of metal plates and an annular rigid resin layer. Each of the plural number of the metal plates has at least one opening corresponding to the combustion chamber hole(s) of the gasket and a plural number of bolt holes, and they are laminated to be overlaid on each other. The first metal plate is disposed on the side of the outer surface of the gasket, and it has a bent portion formed by turning back the peripheral portion of its opening, the bent portion having a curved portion defining the combustion chamber hole of the gasket and is connected to a main portion of the first metal plate and a flange portion extending generally parallel with the main portion. The bent portion encloses the peripheral portion of the opening of the second metal plate which is one of the metal plates laminated. The annular rigid resin layer is disposed on the flat surface of the second metal plate confronting the first metal plate or the inner flat surface of the first metal plate, or on the flat surface of a metal plate disposed between both of the above surfaces so that the annular rigid resin layer surrounds the combustion chamber hole. The thickness of a portion of the gasket in which the rigid resin layer is disposed is larger than that of the remaining portion thereof. The portion of the gasket thickened by the rigid resin layer surrounding the combustion chamber hole provides a higher sealing pressure.

The rigid resin layer is formed of a non-compressible and non-deformable resin such as an epoxy resin, thermocurable polyimide resin and silicone resin, which is not substantially compressed or deformed under a high compression stress. It is preferably formed of an epoxy resin. The rigid resin layer is formed by applying a liquid coating material of a rigid resin and drying for setting hard. The thickness of the rigid resin layer can be freely controlled to a desired thickness, for example, by screen-coating the liquid coating material, or coating with a dispenser. Further, the thickness of the rigid resin layer can be easily adjusted in accordance with a distance from a bolt hole.

The rigid resin layer is disposed on the inner surface of one of the laminated metal plates inside the outer surface of the gasket, and therefore, the rigid resin layer is not worn down by friction with the joint surfaces of a cylinder head and a cylinder block. Also, since the peripheral portion of the opening of the metal plate is enclosed by the bent portion of the first metal plate, the rigid resin layer is not exposed to a high temperature combustion gas from the combustion chamber of an engine.

Alternatively, two metal plates may be so laminated that the second metal plate can not overlap on the flange portion of the bent portion of the first metal plate, and an annular rigid resin layer may be disposed on the inner surface of the first metal plate confronting the flange portion of the bent portion.

DETAILED DESCRIPTION OF THE PREFERRED EMBODIMENTS

Figure 3:
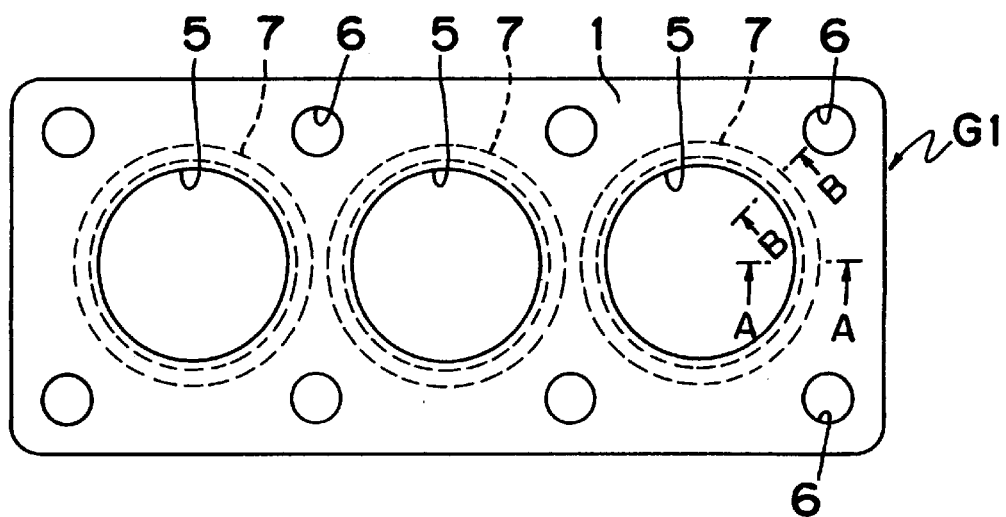
FIG. 3 is a plan view of the first embodiment of the present invention.
Figure 4:
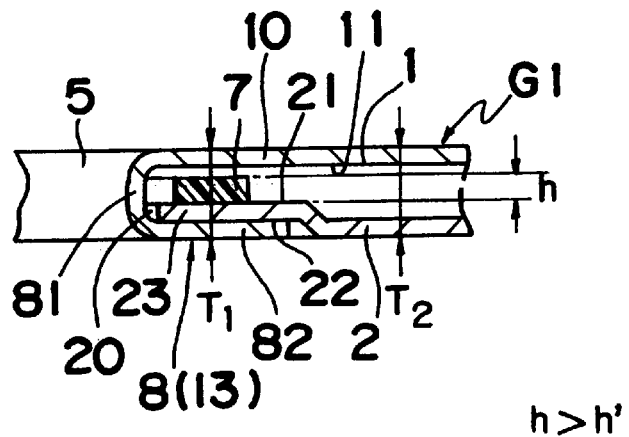
FIG. 4 is a sectional view taken along the line A—A of FIG. 3.
Figure 5:
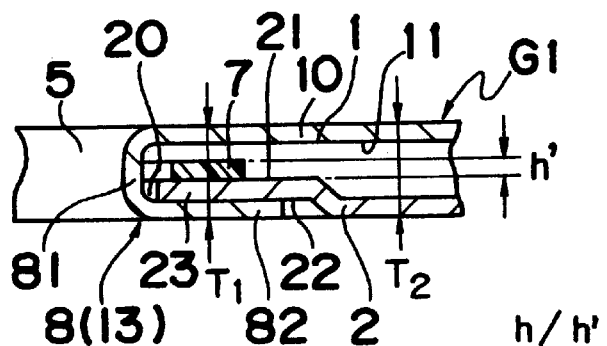
FIG. 5 is a sectional view taken along the line B—B of FIG. 3.

With reference to FIGS. 3 to 5, G1 represents a cylinder head gasket as the first embodiment of the present invention, which has combustion chamber holes 5, bolt holes 6, holes for water passage (not shown), holes for oil passage (not shown) and the like. The gasket G1 comprises a first metal plate 1, a second metal plate 2, and an annular rigid resin layer 7. The first and second metal plates 1 and 2 are made of, for example, stainless steel, and they each have openings corresponding to the combustion chamber holes 5 of the gasket and bolt holes. The first metal plate 1 and the second metal plate 2 are laminated so that they can be overlaid on each other. The first metal plate 1 has a bent portion 8 formed by turning back the peripheral portion 13 of its opening, the bent portion 8 having a curved portion 81 and a flange portion 82. The bent portion 8 encloses the peripheral portion 23 of the opening 20 of the second metal plate 2 and the curved portion 81 defines the combustion chamber hole 5. The flange portion 82 extends generally parallel with the main portion 10 of the first metal plate 1 so as to overlap on the outer surface 22 of the second metal plate 2. The annular rigid resin layer 7 is, for example, 0.10 mm in thickness and 1.0 mm in width. The annular rigid resin layer 7 is disposed on a position of the inner flat surface 21 of the second metal plate 2 which confronts the first metal plate 1 and corresponds to the flange portion 82 of the bent portion 8 of the first metal plate 1 so as to surround the combustion chamber hole 5.

The thickness $T_1$ of a portion of the gasket, in which the rigid resin layer 7 is disposed, is larger than the thickness $T_2$ of a portion of the gasket outside the above portion (a portion spaced away from the combustion chamber hole). When the gasket G1 is applied between the joint surfaces of the cylinder head and the cylinder block and fastened, the above difference in thickness of the gasket provides a higher sealing pressure on the position of the annular rigid resin layer 7 surrounding the combustion chamber hole 5.

The rigid resin layer 7 may be disposed on the inner surface 11 of the first metal plate 1 which confronts the second metal plate 2, instead of the inner surface 21 of the second metal plate 2.

As shown in FIGS. 4 and 5, the thickness h of the rigid resin layer 7 at a position away from the bolt hole (for example, a position at which the resin layer 7 intersects the line A—A) is larger, and the thickness h' of the rigid resin layer 7 at a position in the vicinity of the bolt hole (for example, a position at which the rigid resin layer 7 intersects the line B—B) is smaller. The above difference in thickness of the rigid resin layer 7 uniforms a sealing pressure at the peripheral portion of the combustion chamber hole 5, thereby improving the sealing performance of the gasket. Since a portion of the gasket between each of mutually adjacent combustion chamber holes is under a severe thermal condition, it is preferable that the rigid resin layer is formed thicker at such a portion of the gasket. Also, gas leakage is apt to occur at both lengthwise end portions of the gasket due to bending of the cylinder head, and therefore, it is preferable that the rigid resin layer is formed thicker at such portions.

Figure 1:
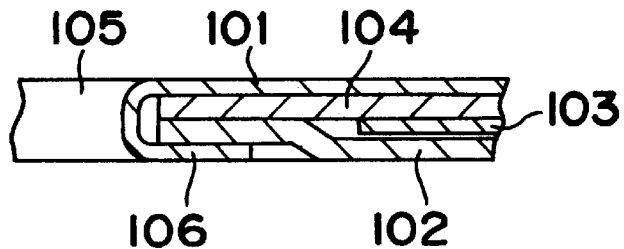
FIG. 1 is a sectional view of a conventional cylinder head gasket.
Figure 2:
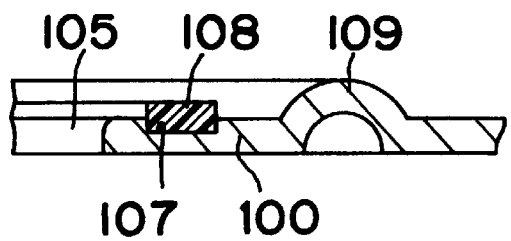
FIG. 2 is a sectional view of a metal gasket according to the preceding invention of the present assignee.

It is unlikely that the rigid resin layer of the cylinder head gasket G1 will deteriorate or burn, because the peripheral portion 23 of the opening 20 of the second metal plate 2 and the rigid resin layer 7 are enclosed in the bent portion 8 of the first metal plate 1 so that the rigid resin layer 7 is completely shielded from a combustion gas from the engine. Further, it is unlikely that the rigid resin layer 7 will be worn down by friction with the joint surfaces of the cylinder head and the cylinder block. Since the rigid resin layer 7 does not wear by the joint surfaces nor peel, it is usually unnecessary to provide in the gaskets of the present invention grooves 107 as shown in the gasket of FIG. 2. Although the gaskets of the present invention usually do not comprise grooves, nevertheless they may be provided.

The rigid resin layer 7 is formed of a noncompressible and non-deformable resin which is not substantially compressed nor deformed under a compression stress, such as, thermo-curable polyimide resin, polyamide-imide resin and silicone resin, preferably formed as an epoxy resin. Examples of epoxy resins include a variety of epoxy resins of bis-phenol A type, novolak type, aliphatic type, hydantoin type, isocyanate type and the like. As curing agents for the resins, there can be used amines, hydrazines, acid anhydrides and imidazoles. These agents can be used alone or in combination. In addition, inorganic fillers such as clay, talc and silica are favorably admixed with the resins.

The rigid resin layer 7 is formed, for example, by screen-coating a liquid coating material of a rigid resin as listed above, then heating and drying or thermo-curing. The resultant rigid resin layer 7 has heat-resistance. The thickness of the rigid resin layer can be varied optionally by adjusting the density of the solid content of a liquid coating material, selecting the size of a mesh for use in screen-coating, repeating application of the liquid coating material a plural number of times or the like. Also, the variation of the thickness of the rigid resin layer in accordance with a position on the peripheral area of the combustion chamber hole 5 can be easily performed by repeating screen-coating a plural number of times (additional application done on a part to be thicker), by controlling the amount of the liquid coating material with the use of a dispenser, or by repeating partial application of the liquid coating material a plural number of times.

In this regard, although not shown in the drawings, a conventional heat resistant sealing material of fluorine rubber, silicone rubber or the like is usually applied to the outer surface of the gasket G1 so as to fill and smooth imperfection such as flaws, roughness and distortion of the joint surfaces of the cylinder head and the cylinder block.

Figure 6:
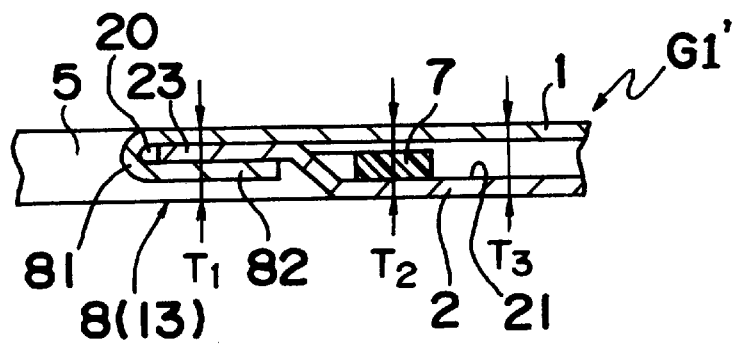
FIG. 6 is a sectional view similar to that of FIG. 4, showing a modification of the first embodiment.

FIG. 6 shows a modified gasket G1' of the first embodiment. In the gasket G1', a rigid resin layer 7 with a thickness of 0.15 mm and width of 2.0 mm is disposed not on a position of the second metal plate 21 which corresponds to the flange portion 82 of the bent portion 8 but on a position outside and in the vicinity of the above position. The gasket G1' is constructed in the same manner as the gasket G1, except for the position of the rigid resin layer. In this modified gasket, the difference between the thickness $T_2$ of the portion of the gasket in which the rigid resin layer 7 is disposed and the thickness $T_3$ of a portion of the gasket outside the above part is equal to the thickness of the rigid resin layer. Further, the difference between the thickness $T_2$ of the above part of the gasket in which the rigid resin layer is disposed and the thickness $T_1$ of a part of the gasket in which the bent portion 8 is disposed is equal to the difference between the thickness of the rigid resin layer 7 (for example, 0.15 mm) and the thickness of the first metal plate 1 (for example, 0.1 mm).

In the gasket as shown in FIG. 6, there is created a sealing pressure distribution in which the largest sealing pressure takes place on the position of the gasket in which the rigid resin layer 7 is disposed outside the bent portion 8, and in which the second largest sealing pressure takes place on the part of the gasket in which the bent portion 8 is disposed. Such a sealing pressure distribution is desirable in case of a gasket for use in a liner type engine which has a cylinder liner inserted into the interior wall of the cylinder of a cylinder block. In this case, an annular high sealing pressure zone is intended to take place on the flange of the liner in order to prevent falling and cracks of the cylinder liner.

Figure 7:
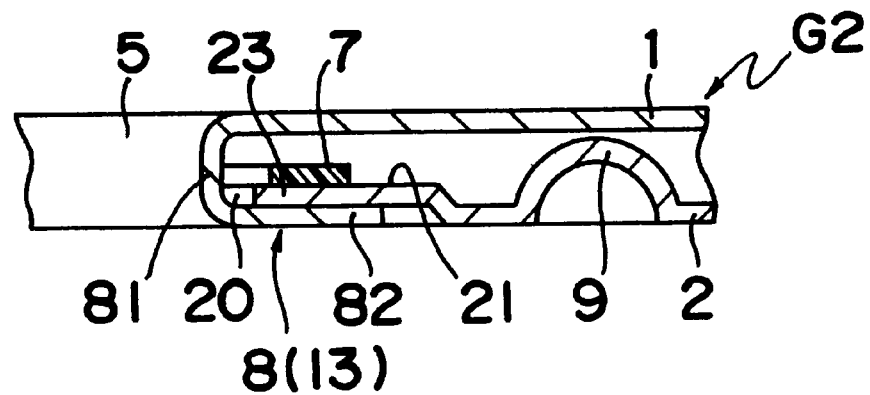
FIG. 7 is a sectional view similar to that of FIG. 4, showing the second embodiment.

In a gasket G2 as the second embodiment of the present invention shown in FIG. 7, a bead portion 9 projecting toward the first metal plate 1 is formed outside a position of the second metal plate 2 which corresponds to the flange portion 82 of the bent portion 8 of the first metal plate 1, that is, outside a position at which the rigid resin layer is disposed. The structure of the gasket G2 other than that is the same as that of the gasket as the first embodiment shown in FIGS. 3 to 5. In the gasket G2, the thickness of the portion of the gasket in which the rigid resin layer 7 is disposed is larger than that of the remaining portion of the gasket and, thus, the following two annular high sealing pressure zones are caused around the peripheral portion of the combustion chamber hole 5: one resulting from the larger thickness of the above portion of the gasket in which the rigid resin layer 7 is disposed, and the other resulting from the resilience of the bead portion 9. As a result, the sealing reliability is improved.

Figure 8:
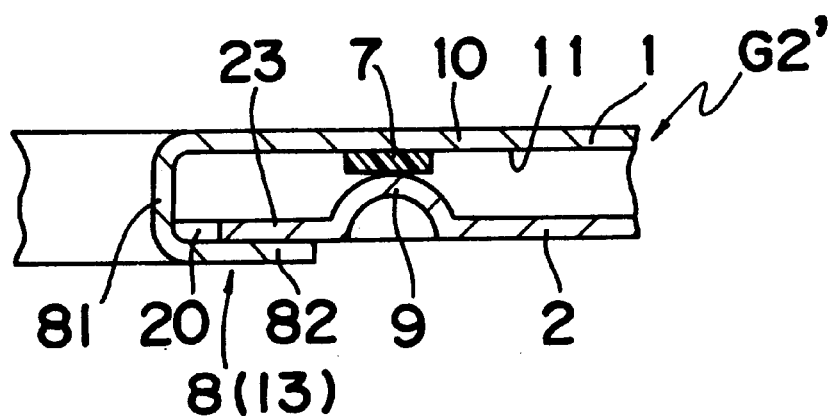
FIG. 8 is a sectional view similar to that of FIG. 4, showing a modification of the second embodiment.

FIG. 8 shows a gasket G2' as a modification of the second embodiment. In the gasket G2', a rigid resin layer 7 is disposed at a position on the inner flat surface 11 of the first metal plate 1 confronting the second metal plate 2 and outside the bent portion 8, and the rigid resin layer 7 is in contact with the top of a bead portion 9. The structure of the gasket G2' other than that is the same as that of the gasket G2 shown in FIG. 7. The gasket G2' can cause a high sealing pressure which comes from superposition of two sealing pressures, i.e. one resulting from the larger thickness of the part of the gasket in which the rigid resin layer 7 is disposed, and the other resulting from the resilience of the bead portion. The resilience of the bead portion also enhances the follow ability of the gasket to deformation of a joint surface.

Figure 9:
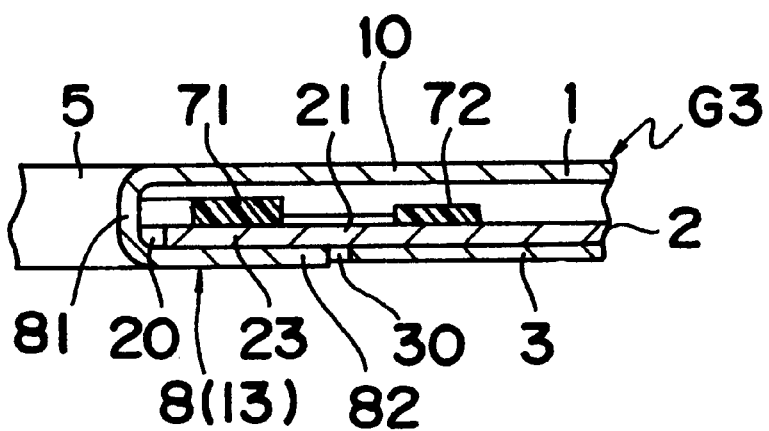
FIG. 9 is sectional view similar to that of FIG. 4, showing the third embodiment.

FIG. 9 shows a cylinder head gasket G3 as the third embodiment of the present invention. The cylinder head gasket G3 comprises a first metal plate 1, second metal plate 2, third metal plate 3, and a first and second annular rigid resin layers 71 and 72. The first, second and third metal plates 1, 2 and 3, each having at least one opening corresponding to the combustion chamber hole(s) 5 of the gasket and bolt holes, are laminated to be overlaid on each other. The second metal plate 2 is placed between the first metal plate 1 and the third metal plate 3 which is a thickness-adjusting plate. The third metal plate 3 has an opening 30 of a larger diameter so as not overlap on the flange portion 82 of the bent portion 8 of the first metal plate 1.

The first metal plate 1 has the bent portion 8 formed by turning back the peripheral portion 13 of its opening, and the bent portion 8 has a curved portion 81 which defines the combustion chamber hole 5, and a flange portion 82 which extends generally parallel with the main portion 10 of the first metal plate 1 and which is overlaid on the outer surface 22 of the second metal plate 2. The bent portion 8 encloses the peripheral portion 23 of the opening 20 of the second metal plate 2. The first rigid resin layer 71 is disposed on a position of the inner flat surface 21 of the second metal plate 2 which confronts the first metal plate 1 and corresponds to the flange portion 82 of the bent portion 8, and the second resin layer 72 is disposed outside the above position. Both rigid resin layers 71 and 72 surround the combustion chamber hole 5. In FIG. 9, the thickness of the third metal plate 3 is smaller than that of the first metal plate 1, and the thickness of the first rigid resin layer 71 is larger than that of the second rigid resin layer 72. The thickness and sealing pressure of the gasket are the largest at the portion of the gasket in which the rigid resin layer 71 is disposed, the second largest at the portion of the gasket in which the outside rigid resin layer 72 is disposed, and the smallest at the portion of the gasket further outside the above portion in which the rigid resin layer 72 is disposed. The sealing pressure becomes the highest at the position of the second rigid resin layer 72 when the thickness of the second rigid resin layer 72 is designed to be larger than that of the first rigid resin layer 71 with the thickness of the first metal plate 1 equal to that of the third metal plate 3. Thus, in accordance with a desired sealing pressure distribution, the thickness of the metal plates and the rigid resin layers can be determined.

Figure 10:
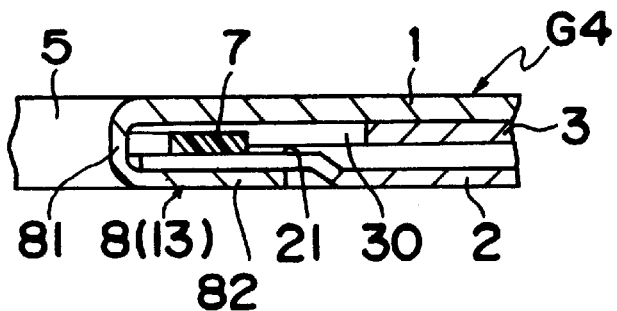
FIG. 10 is a sectional view similar to that of FIG. 4, showing the fourth embodiment.

FIG. 10 shows a gasket G4 as the fourth embodiment of the present invention. In the gasket G4, a third metal plate 3 as a thickness-adjusting plate is interposed between a first metal plate 1 and a second metal plate 2. The third metal plate 3 has an opening 30 of a larger diameter so as not to overlap on the flange portion 82 of the bent portion 8 of the first metal plate 1. The structure of the gasket G4 other than that is the same as that of the gasket G1 as the first embodiment shown in FIGS. 3 to 5.

Figure 11:
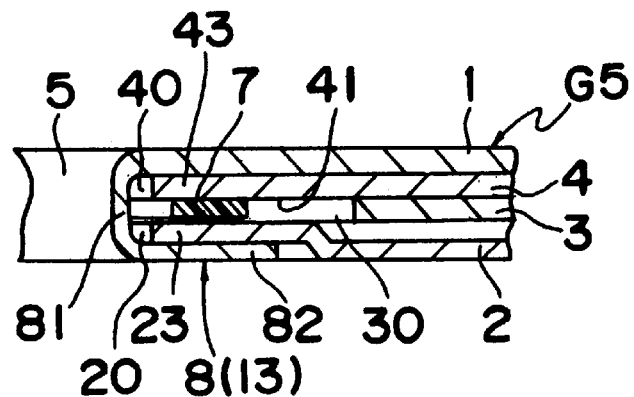
FIG. 11 is a sectional view similar to that of FIG. 4, showing the fifth embodiment.

FIG. 11 shows a gasket G5 as the fifth embodiment of the present invention. The gasket G5 further comprises a fourth metal plate 4. The fourth metal plate 4 is interposed between the first metal plate 1 and the third metal plate 3 which is a thickness adjusting plate and which is laminated so as not to overlap on the flange portion 82 of the bent portion 8 of the first metal plate 1. An annular rigid resin layer 7 is disposed on the flat surface 41 of the fourth metal plate 4 confronting the second metal plate 2 and corresponding to the flange portion 82. The bent portion 8 encloses the peripheral portion 43 of the opening 40 of the fourth metal plate 4, the rigid resin layer 7 and the peripheral portion 23 of the opening 20 of the second metal plate 2.

Figure 12:
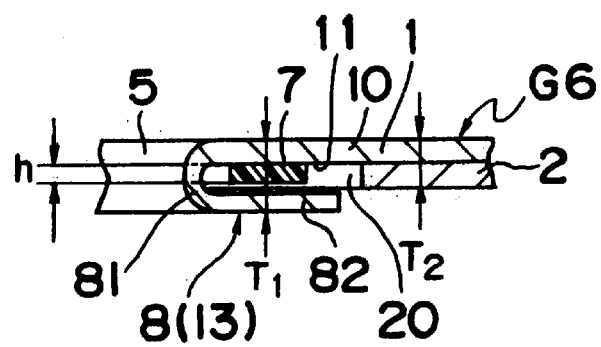
FIG. 12 is a sectional view similar to that of FIG. 4, showing the sixth embodiment.
Figure 13:
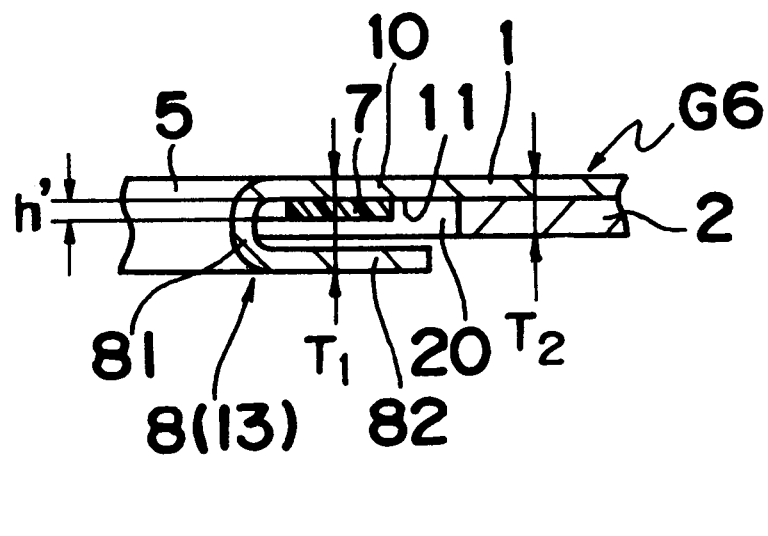
FIG. 13 is a sectional view similar to that of FIG. 5, showing the sixth embodiment.

FIGS. 12 and 13 show a cylinder head gasket G6 as the sixth embodiment of the present invention. The gasket G6 comprises a first metal plate 1, a second metal plate 2, and an annular rigid resin layer 7. The first metal plate 1 and the second metal plate 2, each have at least one opening corresponding to combustion chamber hole(s) 5 and bolt holes, and they are laminated so as to be overlaid on each other. The first metal plate 1 has a bent portion 8 formed by turning back the peripheral portion 13 of its opening, said bent portion having a curved portion 81 which defines the combustion chamber hole 5 and a flange portion 82 extending generally parallel with the main portion 10 of the first metal plate 1. The second metal plate 2 is a thickness-adjusting plate, which has an opening of a large diameter so as not to overlap on the flange portion 82 of the bent portion 8.

The annular rigid resin layer 7 is disposed on a position of the inner flat surface 11 of the main portion 10 of the first metal plate 1 confronting the second metal plate 2 and corresponding to the flange portion 82 of the bent portion 8 so that the annular rigid resin layer 7 surrounds the combustion chamber hole 5. The rigid resin layer 7 is formed such that the thickness h of a portion of the rigid resin layer 7 which is spaced away from a bolt hole disposed around the combustion chamber hole 5 (see FIG. 3) is larger than the thickness h' of a portion thereof in the vicinity of the bolt hole. The thickness $T_1$ of the portion of the gasket G6 in which the annular rigid resin layer 7 is disposed is always larger than the thickness $T_2$ of a portion of the gasket G6 outside the above portion. Enclosed by the bent portion 8, the rigid resin layer 7 is not exposed to a combustion gas nor worn down due to friction with the joint surfaces of a cylinder head and a cylinder block.

Figure 14:
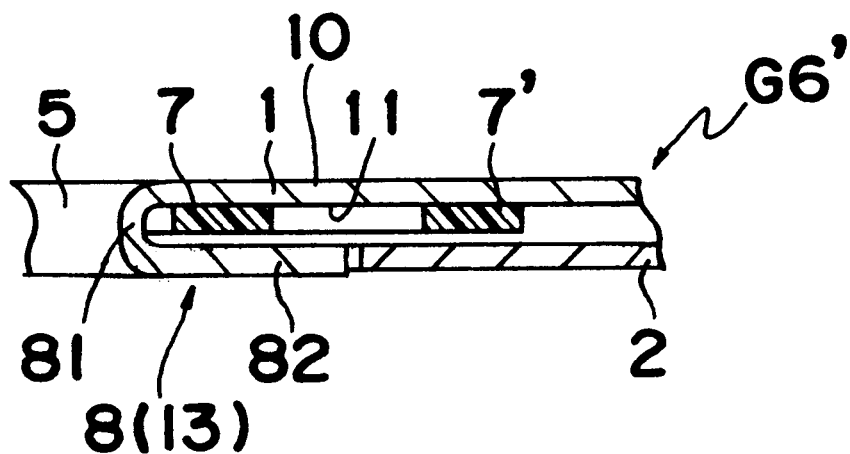
FIG. 14 is a sectional view similar to that of FIG. 4, showing a modification of the sixth embodiment.

FIG. 14 shows a modified gasket G6' of the sixth embodiment. The gasket G6' comprises a first and second rigid resin layers 7 and 7'. The first rigid resin layer 7 is disposed on a position of the inner flat surface 11 of the first metal plate 1 which corresponds to the flange portion 82 of the bent portion 8. The second rigid resin layer 7' is disposed on a position of the inner surface 11 of the first metal plate 1 outside the above position. Thus disposed, both the rigid resin layers 7 and 7' surround the combustion chamber hole 5. In the gasket G6', the thickness of the first metal plate 1 is slightly larger than that of the second metal plate 2, and the annular rigid resin layers 7 and 7' are formed with the same thickness. Consequently, high sealing pressures take place on both sites of the gasket in which the rigid resin layers 7 and 7' are disposed, so that the combustion chamber hole 5 is double-sealed. The modified gasket G6' is used effectively in cases where a combustion gas can not be sealed completely by one sealing pressure zone or where a cylinder head made of aluminum may be depressed.

Figure 15:
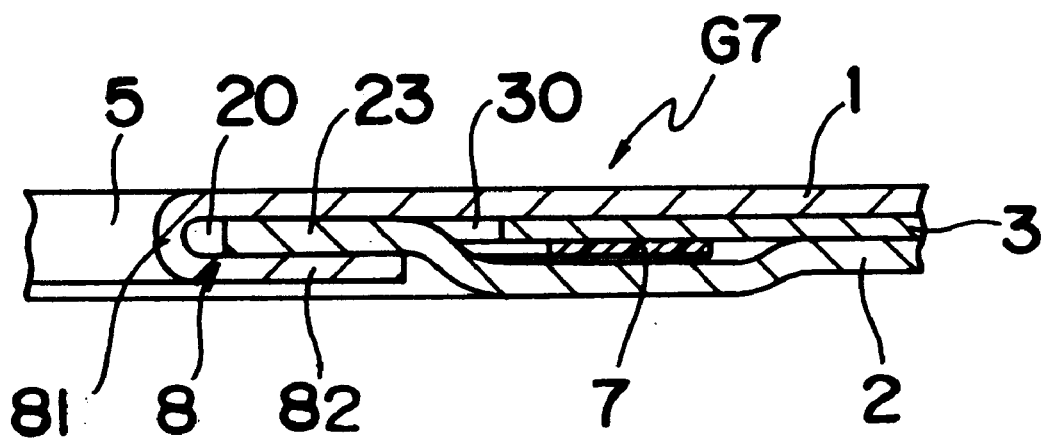
FIG. 15 is a sectional view similar to that of FIG. 4, showing the seventh embodiment.

FIG. 15 shows a cylinder head gasket G7 as the seventh embodiment of the present invention. In the gasket G7, an annular rigid resin layer 7 for surrounding the combustion chamber hole 5 is disposed on a position of the flat surface of the third metal plate 3 confronting the second metal plate 2. The third metal plate 3 is interposed between the first metal plate 1 and the second metal plate 2 of which the peripheral portion 23 of the opening 20 is enclosed by the bent portion 8 of the first metal plate 1. The third metal plate 3 serves as a thickness-adjusting plate, which has an opening of a large diameter so as not to overlap on the flange portion 8b of the bent portion 8 of the first metal plate 1.

The metal gaskets according to the present invention should not be limited to the embodiments and their modifications as mentioned above, and they can be altered or modified variously to an extent that they are not beyond the spirit and scope of the present invention.

What is claimed is:

1. A metal gasket for use in sealing joint surfaces of a cylinder head and a cylinder block of an internal combustion engine, said metal gasket comprising:

a plural number of metal plates with each of said metal plates having at least one opening corresponding to a combustion chamber hole or bolt holes and a high sealing pressure position around said at least one opening, said high sealing pressure position including an annular resin layer;

wherein the plural number of metal plates are laminated so as to be overlaid on each other, wherein a first metal plate of said metal plates has a peripheral portion at the at least one opening and has a bent portion formed by turning back the peripheral portion, said bent portion having a curved portion which defines the combustion chamber hole of the gasket and is connected to a main portion of the first metal plate and a flange portion which extends generally parallel with the main portion, and said bent portion enclosing a peripheral portion of an opening of at least one of the remaining plates;

wherein the annular resin layer is disposed on either a flat surface of the first metal plate or a flat surface of the metal plate enclosed at the peripheral portion of the opening by the bent portion of the first metal plate so that the annular resin layer surrounds the combustion chamber hole;

wherein the gasket in an annular portion in which the annular resin layer is disposed is thicker than a remaining portion of the gasket; and, wherein the thickness and width of the annular resin layer are determined so that a high seal pressure takes place on said annular portion in accordance with a difference in the thickness of the gasket between said annular portion and said remaining portion so as to seal the combustion chamber hole, when the gasket is compressed between the joint surfaces.

2. A metal gasket according to claim 1, wherein the thickness of the annular resin layer is thicker at a position spaced away from a bolt hole disposed around the combustion chamber hole than at a position in the vicinity of the bolt hole.

3. A metal gasket according to claim 1, wherein the annular resin layer is disposed at a position corresponding to the flange portion of the bent portion of the first metal plate.

4. A metal plate according to claim 1, wherein the annular resin layer is disposed at a position outside the flange portion of the bent portion of the first metal plate.

5. A metal gasket according to claim 1, wherein annular resin layers are disposed respectively at a position corresponding to the flange portion of the bent portion of the first metal plate and at a position outside the position corresponding to the flange portion.

6. A metal gasket according to claim 1, wherein one of the metal plates other than the first metal plate is provided with a bead portion for surrounding the combustion chamber hole generally parallel with the annular resin layer.

7. A metal gasket according to claim 1, wherein one of the metal plates other than the first metal plate is provided with a bead portion for surrounding the combustion chamber hole at a position outside a position corresponding to the flange portion of the bent portion and a position corresponding to the annular resin layer; and a top of the bead portion confronts the annular resin layer.

8. A metal gasket according to claim 1, wherein the annular resin layer is formed from an epoxy resin.

9. A metal gasket for use in sealing joint surfaces of a cylinder head and a cylinder block of an internal combustion engine, said gasket comprising:

a first metal plate, a second metal plate, and an annular non-compressible resin layer, the first metal plate and the second metal plate each having at least one opening corresponding to a combustion chamber hole and bolt holes;

wherein the first and second metal plates are laminated to be overlaid on each other, wherein said first metal plate has a bent portion formed by turning back a peripheral portion of said at least one opening, said bent portion having a curved portion which defines the combustion chamber hole and is connected to a main portion and a flange portion which extends generally parallel with the main portion;

wherein said second metal plate has an opening of a large diameter so as not to overlap on said flange portion;

wherein said annular non-compressible resin layer is disposed on an inner flat surface of the main portion of the first metal plate at a position corresponding to said flange portion so that the annular non-compressible resin layer surrounds the combustion chamber hole;

wherein the gasket in an annular portion in which said resin layer is disposed is thicker than a remaining portion of the gasket; and, wherein the thickness and width of the annular non-compressible resin layer are determined so that a high seal pressure takes place on said annular portion in accordance with a difference in the thickness of the gasket between said annular portion and said remaining portion so as to seal the combustion chamber hole, when the gasket is compressed between the joint surfaces.

10. A metal gasket according to claim 9, wherein a second resin layer is disposed on either the inner flat surface of the first metal plate or an inner flat surface of the second metal plate so that the second resin layer surrounds the combustion chamber hole outside the flange portion of the bent portion.

11. A metal gasket according to claim 9, wherein the resin layer is thicker at a position spaced away from a bolt hole disposed around the combustion chamber hole than at a position in the vicinity of the bolt hole.

12. A metal gasket according to claim 9, wherein the annular resin layer is formed from an epoxy resin.

13. A metal gasket for use in sealing joint surfaces of a cylinder head and a cylinder block of an internal combustion engine, said gasket comprising a plural number of metal plates, including a first metal plate, and an annular non-compressible resin layer, said metal plates each having at least one opening corresponding to a combustion chamber hole and bolt holes;

wherein the plural number of the metal plates are laminated to be overlaid on each other, the first metal plate of the plural number of metal plates having a bent portion formed by turning back a peripheral portion of the at least one opening, said bent portion having a curved portion which defines the combustion chamber hole of the gasket and is connected to a main portion of the first metal plate and a flange portion which extends generally parallel with the main portion, and said bent portion enclosing a peripheral portion of an opening of at least one of the remaining metal plates;

wherein said opening of said at least one of the remaining metal plates is of a large diameter so as not to overlap on the flange portion of the bent portion;

wherein the annular non-compressible resin layer is disposed on a flat surface of said metal plate having the opening of a large diameter so as to surround the combustion chamber hole;

wherein the gasket in an annular portion in which said resin layer is disposed is thicker than a remaining portion of the gasket; and wherein the thickness and width of the annular non-compressible resin layer are determined so that a high seal pressure takes place on said annular portion in accordance with a difference in the thickness of the gasket between said annular portion and said remaining portion so as to seal the combustion chamber hole, when the gasket is compressed between the joint surfaces.

14. A metal gasket according to claim 13, wherein the resin layer is thicker at a position spaced away from a bolt hole disposed around the combustion chamber hole than at a position in the vicinity of the bolt hole.

15. A metal gasket according to claim 13, wherein the annular resin layer is formed from an epoxy resin.

* * * * *